No. 627,743.  
C. L. BESSONETTE.  
ROLLER COTTON PRESS.  
(Application filed Apr. 4, 1895.)  
Patented June 27, 1899.
(No Model.)
2 Sheets—Sheet 2.
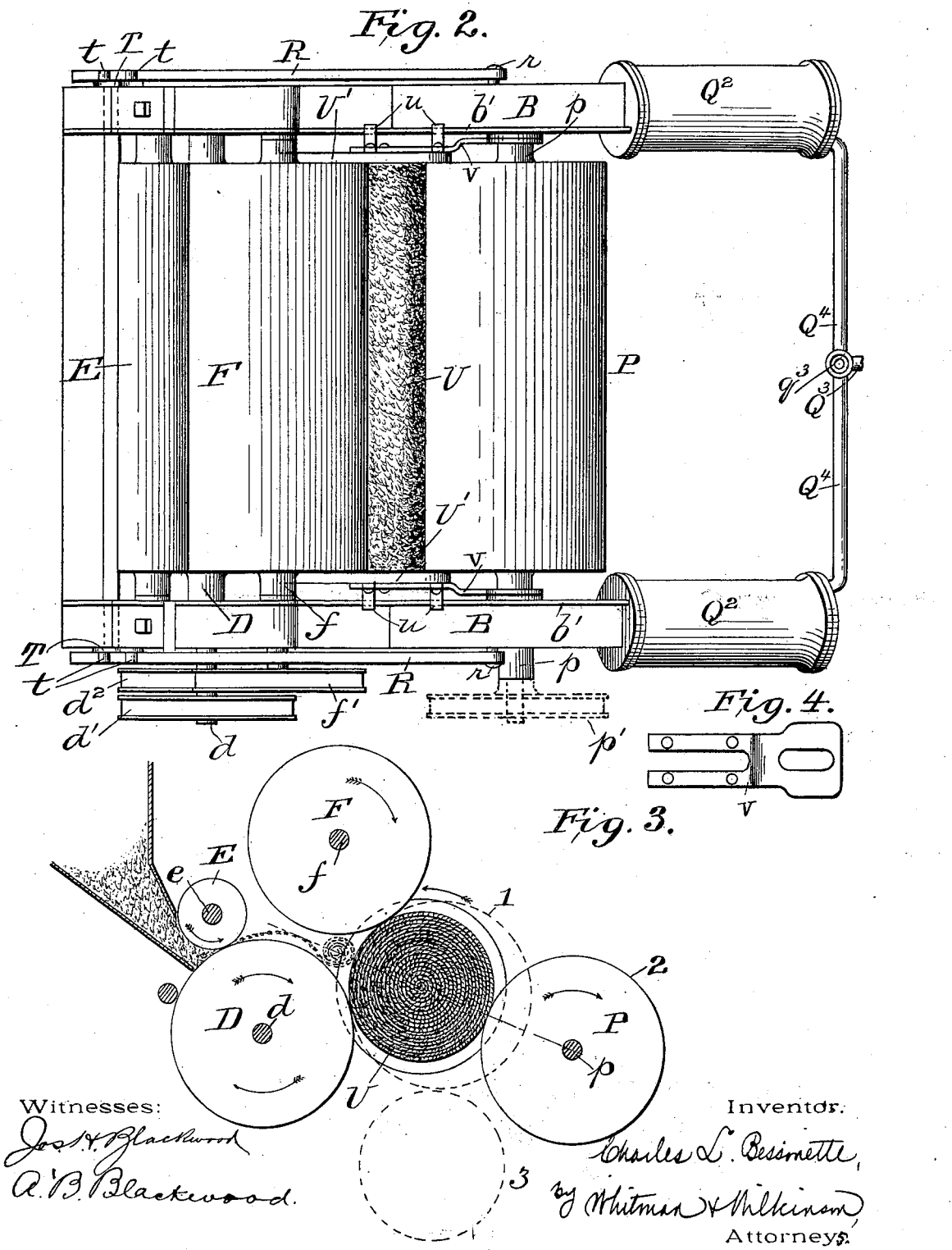

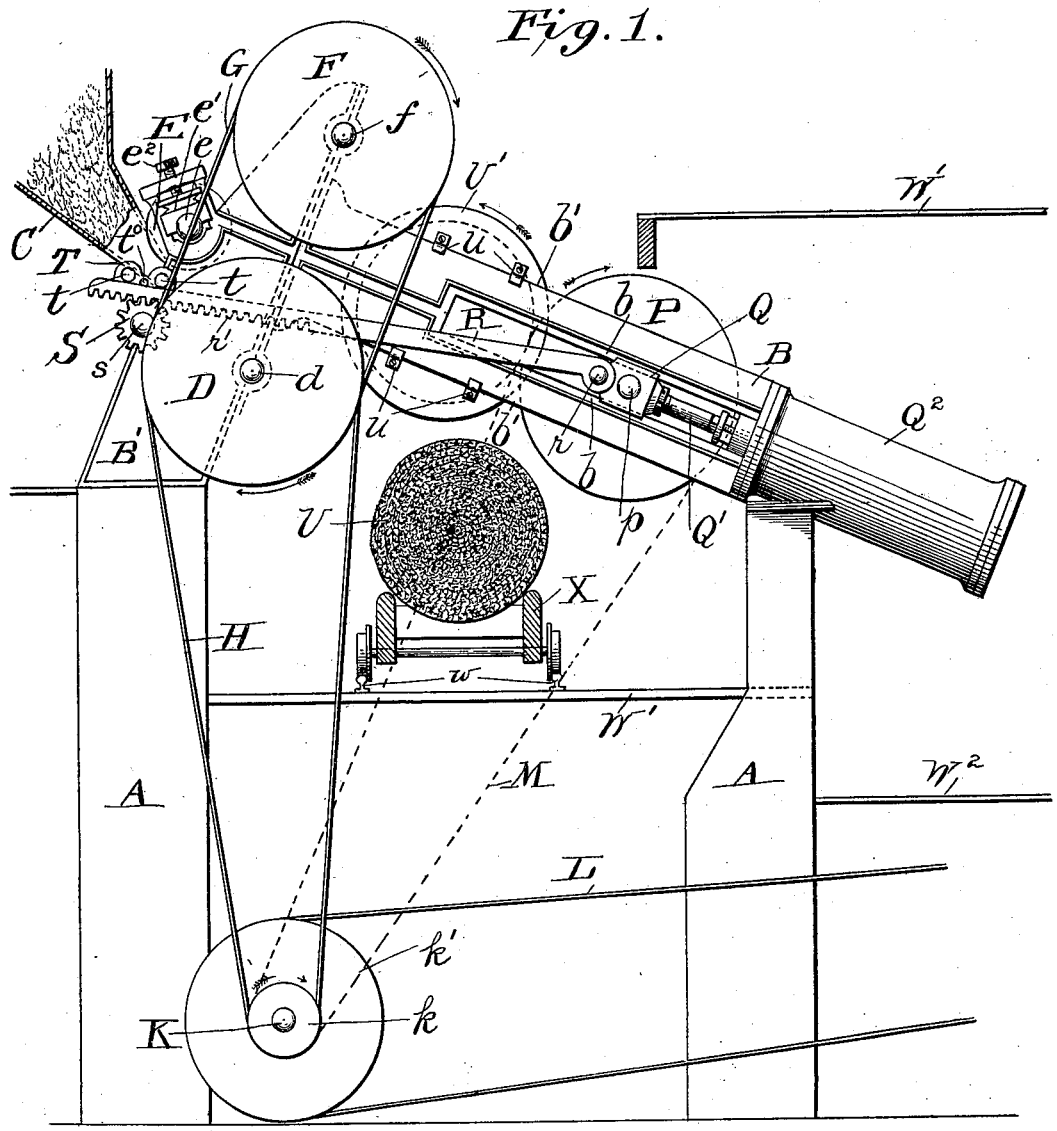

UNITED STATES PATENT OFFICE.

CHARLES L. BESSONETTE, OF WACO, TEXAS, ASSIGNOR, BY MESNE ASSIGNMENTS, TO THE AMERICAN COTTON COMPANY, OF NEW YORK, N. Y.

ROLLER COTTON-PRESS.

SPECIFICATION forming part of Letters Patent No. 627,743, dated June 27, 1899.

Application filed April 4, 1895. Serial No. 544,467. (No model.)

*To all whom it may concern:*

Be it known that I, CHARLES L. BESSONETTE, a citizen of the United States, residing at Waco, in the county of McLennan and State of Texas, have invented certain new and useful Improvements in Roller Cotton-Compresses; and I do hereby declare the following to be a full, clear, and exact description of the invention, such as will enable others skilled in the art to which it appertains to make and use the same.

My invention relates to improvements in roller-compresses; and it consists of certain novel features hereinafter described and claimed.

Reference is had to the accompanying drawings, in which the same parts are indicated by the same letters throughout the several views.

Figure 1 represents a side elevation, partly in section, of the cotton-compress in the position it assumes just before the bale is completed, and a finished bale is also shown as resting on a truck after being dropped out of the press. Fig. 2 represents a plan view of the press shown in side elevation in Fig. 1, the operator's platform being omitted. Fig. 3 represents a diagrammatic view of the various rollers and illustrates the method of winding up the cotton first into a core and afterward into a finished bale. Fig. 4 represents a detail view showing the link by means of which the sliding head for the bale is connected to the shaft of the movable compressor-roller.

A represents the foundation on which the frame B for the cylinders and sliding journal-boxes and the frame B' for the fixed bearings of the upper rollers are mounted.

C represents a chute for conveying the cotton from the condenser.

D represents a roller mounted on a shaft $d$ in fixed bearings in the frame B'.

E represents a smaller or auxiliary roller for applying initial pressure to the cotton from the condenser and for pressing it out into a thin bat before it is admitted to the press proper. This roller E is mounted on the shaft $e$, which is held under the sliding bearing $e'$, which is adjusted by means of the screw $e^2$, as shown in Fig. 1.

F represents the upper compressor-roller, which is mounted on the shaft $f$, journaled in fixed bearings in the frame B'. These rollers F and B are at some little distance apart, as is shown most clearly in Fig. 3. These two rollers D and F are connected by the belt G, mounted on the pulleys $d^2$ and $f'$ on the shafts $d$ and $f$, respectively. The shaft $d$ is driven by the belt H, which passes over the pulley $d^3$ on the said shaft and also over the pulley $k$ on the driving-shaft K. Another pulley $k'$ on this driving-shaft K is driven by the belt L from the source of power, which may be any suitable source of power. The sliding roller P may also be driven by a belt M, (indicated in dotted lines in Fig. 1;) but this roller will be revolved by the bale and this belt M will not ordinarily be necessary. It will be obvious that sprocket-chains or other suitable gearing may be substituted for any or all of the belts, if desired.

The sliding roller P is mounted on a shaft $p$, journaled in the sliding boxes Q, each one of which is connected to the piston-rods Q' of the cylinders $Q^2$. These cylinders are preferably single-acting and are fed by a steam or other fluid pressure pipe $Q^3$, provided with a three-way cock $q^3$, connected to the branch pipes $Q^4$. The frame B is rigidly connected to each of these cylinders and is provided with guideways $b$ for the sliding journal-boxes Q. These boxes Q are connected by means of the rack-bars R, pivoted at $r$, to the pinions S, mounted on the shafts $s$, by means of which rack-bars the pressures of the two cylinders are equalized, and thus the pressure on each end of the bale is the same. The rack-bars R are held down on the pinions S by plates T, provided with antifriction-rollers $t$. These plates are pivoted, as at $t^0$, (see Fig. 1,) so as to admit their swinging through an angle of the rack-bars R. The bale U is rolled up between the sliding heads U', which are held by the sliding clamps $u$ on the edges $b'$ of the frame B. The bale is without a core and is formed from the bat, which enters in the direction shown in dotted lines in Fig. 3, the parts of the bat turning back upon themselves and forming a wad or core of cotton, which gradually winds up into a cylindrical bale against the pressure of the roller P. The positions of the roller P when the bale is just begun and when it is about finished are shown by the dotted circle 1 and the full circle 2 in Fig. 3.

The directions of the various rollers and of the bale are shown by the arrows in Figs. 1 and 3.

The sliding heads U' are connected by means of the links V to the shaft $p$, and they are so arranged, as shown in Fig. 4, that the bearings of the said shaft will travel about a foot in the frame B before drawing the head along with said shaft. It will thus be seen that the cotton is wound up into a coreless bale between the smooth faces of the sliding heads U' and that when the bale is completed the pressure on the cylinders $Q^2$ is released, and the roller P, sliding down by its own weight, enables the bale, which had been previously securely held between the rollers D, F, and P, to drop down from between the heads U', as shown by the dotted circle 3 in Fig. 3.

By having a truck X arranged to run beneath the compress, as on tracks $w$, mounted on the floor W', the bale may be dropped onto the said truck and run out for the subsequent processes of covering and capping.

W, W', and $W^2$ represent floors or platforms for the operatives, and the usual means for starting and stopping the engine or the compress should be provided; but as there are an indefinite number of methods of accomplishing this desired result which are well known in the art none are shown herein.

It will thus be seen that I provide a compress which rolls up the cotton without a core and from which a bale may be readily detached. It will also be seen that the cylinders $Q^2$, which are single-acting, effect by gravity the withdrawal of the compressor-roller P and the release of the bale. It will also be obvious that the herein-described apparatus furnishes a cheap, simple, and convenient method of manufacturing a cylindrical bale of cotton. These and the various other advantages of the said invention will be readily understood by any one skilled in the art.

Having thus described my invention, what I claim, and desire to secure by Letters Patent of the United States, is—

1. In a cotton-press, the combination of a pair of baling-rolls mounted in stationary bearing-boxes, with a space between said rolls through which a sheet or bat of cotton may pass, the said rolls pressing upon one side of the bale in formation, and means coöperating with said baling-rolls for pressing on the other side of the bale and movable away from the stationary baling-rolls in a line at right angles to the plane thereof, whereby the geometrical center of the bale will during its entire formation be maintained in a plane at right angles to that of the stationary baling-rolls, substantially as set forth.

2. In a cotton-press, the combination of a pair of baling-rolls mounted in stationary bearing-boxes, with a space between said rolls through which a sheet or bat of cotton may pass, the said rolls pressing upon one side of the bale in formation, and a third baling-roll mounted in sliding bearing-boxes and pressing on the other side of the bale, the latter roll moving away from the stationary rolls in a line at right angles to the plane of the stationary rolls, substantially as set forth.

3. In a cotton-press, the combination of a pair of baling-rolls mounted in stationary bearing-boxes, with a space between said rolls through which a sheet or bat may pass, the said rolls pressing upon one side of the bale in formation, means for compressing the sheet or bat prior to the passage of the same through said space, and means coöperating with said baling-rolls for pressing on the other side of the bale and movable away from the stationary baling-rolls in a line at right angles to the plane thereof, whereby the geometrical center of the bale will, during its entire formation, be maintained in a plane at right angles to that of the stationary baling-rolls, substantially as set forth.

4. In a cotton-press, the combination of a pair of baling-rolls mounted in stationary bearing-boxes, with a space between said rolls through which a sheet or bat may pass, the said rolls pressing upon one side of the bale in formation, a compression-roller positioned close to the periphery of one of said rolls and beneath which the bat or sheet passes so as to be compressed before its passage through said space, and means coöperating with said baling-rolls for pressing on the other side of the bale and movable away from the stationary baling-rolls in a line at right angles to the plane thereof, whereby the geometrical center of the bale, will during its entire formation, be maintained in a plane at right angles to that of the stationary baling-rolls, substantially as set forth.

5. In a cotton-press, the combination of a pair of baling-rolls mounted in stationary bearing-boxes, with a space between said rolls through which a sheet or bat may pass, the said rolls pressing upon one side of the bale in formation, a compression-roller positioned close to the periphery of one of said rolls and beneath which the sheet or bat passes so as to be compressed before its passage through said space, and a third baling-roll mounted in sliding bearing-boxes and pressing on the other side of the bale, the latter roll moving away from the stationary rolls in a line at right angles to the plane of the stationary rolls, substantially as set forth.

6. In a cotton-press, the combination of a pair of baling-rolls mounted in stationary bearing-boxes, and pressing on one side of the bale, connections between said rolls for rotating them in the same direction, a main driving-shaft, connections between the same and one of the said baling-rolls, and means coöperating with said baling-rolls for pressing on the other side of the bale and movable away from the stationary baling-rolls, substantially as set forth.

7. In a roller cotton-compress, the combination with an inclined frame, of a pair of compressor-rollers journaled in fixed bearings near the upper end of the said frame, and having their circumferences moving in the same direction and at some distance apart from each other, of a lower compressor-roller journaled in movable bearings in said inclined frame, and means for forcing said lower roller upward in said frame toward said upper rollers, and for withdrawing the pressure therefrom and allowing it to slide downward in said frame, substantially as described.

8. In a roller cotton-compress, the combination with an inclined frame, of a pair of compressor-rollers journaled in fixed bearings near the upper end of the said frame, and having their circumferences moving in the same direction and at some distance apart from each other, of a lower compressor-roller journaled in movable bearings in said inclined frame, means for forcing said movable bearings and the roller carried thereby upward toward said upper rollers, and for withdrawing the pressure therefrom and allowing it to slide downward in said frame, a transverse shaft with pinions fast thereon, and rack-bars attached to said movable bearings and meshing in said pinions, substantially as and for the purposes described.

9. In a roller cotton-compress, the combination with a frame, of a pair of compressor-rollers journaled in fixed bearings in said frame, and having their circumferences moving in the same direction and at some distance apart from each other, of a compressor-roller journaled in movable bearings in said frame, means for forcing said movable bearings and the roller journaled therein toward said pair of rollers, and for withdrawing them away therefrom, a transverse shaft journaled in said frame, pinions fast on said shaft, and rack-bars attached to said movable bearings and meshing in said pinions, substantially as described.

10. In a roller cotton-compress, the combination with an inclined frame, of a pair of compressor-rollers journaled in fixed bearings near the upper end of the said frame, and having their circumferences moving in the same direction and at some distance apart from each other, of a lower compressor-roller journaled in movable bearings in said inclined frame, a pair of single-acting cylinders with piston-rods connected to said movable bearings for forcing them and the roller journaled therein upward toward said upper rollers, and for withdrawing the pressure therefrom and allowing them to slide downward in said frame, substantially as described.

11. In a roller cotton-compress, the combination with a frame, of a pair of compressor-rollers journaled in fixed bearings in said frame, and having their circumferences moving in the same direction and at some distance apart from each other, of a compressor-roller journaled in movable bearings in said frame, and means for forcing said movable bearings and the roller journaled therein toward said pair of rollers, and for withdrawing them away therefrom, and squaring-heads for the bale sliding on guides between said compressor-rollers and overlapping the ends of said rollers, whereby a coreless bale may be formed, substantially as described.

12. In a roller cotton-compress, the combination with an inclined frame, of a pair of compressor-rollers journaled in fixed bearings near the upper end of the said frame, and having their circumferences moving in the same direction and at some distance apart from each other, of a lower compressor-roller journaled in movable bearings in said inclined frame, and means for forcing said lower roller upward in said frame toward said upper rollers, and for withdrawing the pressure therefrom and allowing it to slide downward in said frame, and squaring-heads for the bale sliding on guides between said compressor-rollers and overlapping the ends of said rollers, substantially as described.

13. In a roller cotton-compress, the combination with an inclined frame, of a pair of compressor-rollers journaled in fixed bearings near the upper end of the said frame, and having their circumferences moving in the same direction and at some distance apart from each other, of a lower compressor-roller journaled in movable bearings in said inclined frame, means for forcing said movable bearings and the roller carried thereby upward toward said upper rollers, and for withdrawing the pressure therefrom and allowing it to slide downward in said frame, a transverse shaft with pinions fast thereon, and rack-bars attached to said movable bearings and meshing in said pinions, and squaring-heads for the bale sliding on guides between said compressor-rollers and overlapping the ends of said rollers, substantially as and for the purposes described.

14. In a roller cotton-compress, the combination with a frame, of a pair of compressor-rollers journaled in fixed bearings in said frame, and having their circumferences moving in the same direction and at some distance apart from each other, of a compressor-roller journaled in movable bearings in said frame, means for forcing said movable bearings and the roller journaled therein toward said pair of rollers, and for withdrawing them away therefrom, a transverse shaft journaled in said frame, pinions fast on said shaft, and rack-bars attached to said movable bearings and meshing in said pinions, and squaring-heads for the bale sliding on guides between said compressor-rollers and overlapping the ends of said rollers, substantially as described.

15. In a roller cotton-compress, the combination with an inclined frame, of a pair of compressor-rollers journaled in fixed bearings near the upper end of the said frame, and having their circumferences moving in the same direction and at some distance apart from each other, of a lower compressor-roller journaled in movable bearings in said inclined frame, a pair of single-acting cylinders with piston-rods connected to said movable bearings for forcing them and the roller journaled therein upward toward said upper rollers, and for withdrawing the pressure therefrom and allowing them to slide downward in said frame, and squaring-heads for the bale sliding on guides between said compressor-rollers and overlapping the ends of said rollers, substantially as described.

16. In a roller cotton-compress the combination with a roller journaled in fixed bearings, a second roller journaled in movable bearings, and a pair of squaring-heads for the bale held against revolution but sliding on guides between said rollers and overlapping the ends thereof, substantially as described.

17. In a roller cotton-compress, the combination with a pair of rollers journaled in fixed bearings, of a third roller journaled in movable bearings, and of a pair of squaring-heads for the bale held against revolution but sliding on guides between said rollers and overlapping the ends thereof, substantially as described.

18. In a roller cotton-compress, the combination with a frame, of a pair of compressor-rollers journaled in fixed bearings in said frame, and having their circumferences moving in the same direction and at some distance apart from each other, of a compressor-roller journaled in movable bearings in said frame, and means for forcing said movable bearings and the roller journaled therein toward said pair of rollers, and for withdrawing them away therefrom, and squaring-heads for the bale sliding on guides between said compressor-rollers and overlapping the ends of said rollers, and slotted links connecting said squaring-heads to said movable bearings and adapted to allow a limited play of said bearings in said links, whereby a coreless bale may be formed, substantially as described.

19. In a roller cotton-compress, the combination with an inclined frame, of a pair of compressor-rollers journaled in fixed bearings near the upper end of the said frame, and having their circumferences moving in the same direction and at some distance apart from each other, of a lower compressor-roller journaled in movable bearings in said inclined frame, and means for forcing said lower roller upward in said frame toward said upper rollers, and for withdrawing the pressure therefrom and allowing it to slide downward in said frame, and squaring-heads for the bale sliding on guides between said compressor-rollers and overlapping the ends of said rollers, and slotted links connecting said squaring-heads to said movable bearings and adapted to allow a limited play of said bearings in said links, substantially as described.

20. In a roller cotton-compress, the combination with an inclined frame, of a pair of compressor-rollers journaled in fixed bearings near the upper end of the said frame, and having their circumferences moving in the same direction and at some distance apart from each other, of a lower compressor-roller journaled in movable bearings in said inclined frame, means for forcing said movable bearings and the roller carried thereby upward toward said upper rollers, and for withdrawing the pressure therefrom and allowing it to slide downward in said frame, a transverse shaft with pinions fast thereon, and rack-bars attached to said movable bearings and meshing in said pinions, and squaring-heads for the bale sliding on guides between said compressor-rollers and overlapping the ends of said rollers, and slotted links connecting said squaring-heads to said movable bearings and adapted to allow a limited play of said bearings in said links, substantially as and for the purposes described.

21. In a roller cotton-compress, the combination with a frame, of a pair of compressor-rollers journaled in fixed bearings in said frame, and having their circumferences moving in the same direction and at some distance apart from each other, of a compressor-roller journaled in movable bearings in said frame, means for forcing said movable bearings and the roller journaled therein toward said pair of rollers, and for withdrawing them away therefrom, a transverse shaft journaled in said frame, pinions fast on said shaft, and rack-bars attached to said movable bearings and meshing in said pinions, and squaring-heads for the bale sliding on guides between said compressor-rollers and overlapping the ends of said rollers, and slotted links connecting said squaring-heads to said movable bearings and adapted to allow a limited play of said bearings in said links, substantially as described.

22. In a roller cotton-compress, the combination with an inclined frame, of a pair of compressor-rollers journaled in fixed bearings near the upper end of the said frame, and having their circumferences moving in the same direction and at some distance apart from each other, of a lower compressor-roller journaled in movable bearings in said inclined frame, a pair of single-acting cylinders with piston-rods connected to said movable bearings for forcing them and the roller journaled therein upward toward said upper rollers, and for withdrawing the pressure therefrom and allowing them to slide downward in said frame, and squaring-heads for the bale sliding on guides between said compressor-rollers and overlapping the ends of said rollers, and slotted links connecting said squaring-heads to said movable bearings and adapted to allow a limited play of said bearings in said links, substantially as described.

CHARLES L. BESSONETTE.

Witnesses:
J. C. WILSON,
A. M. ALEXANDER.